(12) United States Patent
Misler et al.

(10) Patent No.: US 12,705,422 B2
(45) Date of Patent: Aug. 11, 2026

(54) MACHINE LEARNING SYSTEM FOR GENERATING RECOMMENDED ELECTRONIC ACTIONS

(71) Applicant: THE TORONTO-DOMINION BANK, Toronto (CA)

(72) Inventors: Matthew Walter Misler, Mississauga (CA); Devon David Jorlett, Crystal, MN (US); Blake Andrew Dudgeon, Milton (CA)

(73) Assignee: The Toronto-Dominion Bank, Toronto (CA)

( * ) Notice: Subject to any disclaimer, the term of this patent is extended or adjusted under 35 U.S.C. 154(b) by 313 days.

(21) Appl. No.: 18/628,361

(22) Filed: Apr. 5, 2024

(65) Prior Publication Data

US 2024/0338520 A1 Oct. 10, 2024

Related U.S. Application Data

(60) Provisional application No. 63/457,933, filed on Apr. 7, 2023.

(51) Int. Cl.

| | |
|---|---|
| ***G06Q 30/02*** | (2023.01) |
| ***G06F 3/0482*** | (2013.01) |
| ***G06F 40/174*** | (2020.01) |
| ***G06F 40/20*** | (2020.01) |

(52) U.S. Cl.
CPC ............ *G06F 40/20* (2020.01); *G06F 3/0482* (2013.01); *G06F 40/174* (2020.01)

(58) Field of Classification Search
CPC ....... G06F 40/20; G06F 3/0482; G06F 40/174
See application file for complete search history.

(56) References Cited

U.S. PATENT DOCUMENTS

| | | | | |
|---|---|---|---|---|
| 2019/0251169 | A1* | 8/2019 | Loghmani | G06F 40/295 |
| 2021/0065223 | A1* | 3/2021 | Blecha-Ward | G06Q 30/0203 |
| 2022/0230194 | A1* | 7/2022 | Reynolds | G06F 40/40 |
| 2022/0277031 | A1* | 9/2022 | Quamar | G06N 3/09 |
| 2024/0046393 | A1* | 2/2024 | Butsch | G06Q 50/2057 |
| 2024/0242802 | A1* | 7/2024 | Yazdavar | G16H 50/20 |
| 2025/0232263 | A1* | 7/2025 | Lee | G06Q 10/063112 |
| 2025/0259193 | A1* | 8/2025 | Nakanishi | G06Q 30/0201 |

OTHER PUBLICATIONS

"GNN-Ensemble: Towards Random Decision Graph Neural Networks" (Wenqi Wei, Mu Qiao, Divyesh Jadav; Published in BigData Congress Services on Mar. 20, 2023; available at https://doi.org/10.48550/arXiv.2303.11376) (Year: 2023).*

* cited by examiner

*Primary Examiner* — James M Detweiler
(74) *Attorney, Agent, or Firm* — CPST Intellectual Property Inc.; Brett J. Slaney

(57) ABSTRACT

In one or more aspects, there is provided a machine learning system and method for generating recommended electronic actions on user interfaces of requesting user interface query devices. In one or more aspects there is provided a machine learning based engine and device to process multiple modes of input user interface data utilizing natural language processing and machine learning models for processing different modes and determining intelligent computerized responses and digital actions based on the machine learning processing.

17 Claims, 10 Drawing Sheets

MACHINE LEARNING SYSTEM FOR GENERATING RECOMMENDED ELECTRONIC ACTIONS

CROSS-REFERENCE TO RELATED APPLICATION

This application claims the benefit of U.S. Provisional Patent Application No. 63/457,933 Filed Apr. 7, 2023, and entitled "IMPROVED MACHINE LEARNING SYSTEM FOR GENERATING RECOMMENDED ELECTRONIC ACTIONS", the entire contents of which is incorporated by reference herein in its entirety.

FIELD

The present disclosure relates to a machine learning based tool and device to process multiple modes of input user interface data utilizing natural language processing and machine learning models for determining intelligent computerized responses and digital actions.

BACKGROUND

Past analytics models have been focused on understanding single dimensions of data and struggled with accurately deciphering multi dimensional data and making predictions therefrom. As the types of information which may be gathered on user interfaces such as digital questionnaires or interactive graphical user interface screens or applications or other input interfaces may vastly vary and be difficult to interpret by the receiving computing devices, there is a need to better extract information from various data sources and computer applications in computing environments. There is a need to improve existing analytical models to understand multi-dimensional data in a computerized environment and determine intelligent user interfaces.

SUMMARY

In at least one aspect, there is provided a computer implemented system comprising: an electronic data store comprising a plurality of data records, each data record comprising at least two different types of input data for an entity having categorical variables and free-form textual data and associated properties received as graphical user interface (GUI) input fields on user interface elements of a graphical user interface of a requesting device; one or more hardware processors in communication with a computer readable medium storing software instructions that are executable by the one or more hardware processors in order to cause the computer system to: direct a first type of data corresponding to the free-form textual data to a natural language processor for deriving therefrom categorical and continuous attributes; feed a defined set of demographical data to the natural language processor and combine an output of the categorical and continuous attributes with the demographic data to a candidate data store; direct a second type of data corresponding to the categorical variables to generate an entity graph also configured to receive an input of other prior data records and corresponding attributes to determine relationships in the entity graph and a comparison between common attributes of current and prior data records; feed the entity graph to a graph convolutional network for determining common digital paths for the prior data records to reach a given state providing an entity graph output; and combine the entity graph output and information retrieved from the candidate data store in an ensemble model for providing a single output prediction of intelligent query responses comprising recommended visualization of recommended digital actions for the requesting computing device associated with a particular data record.

In at least one aspect, there is provided a computer implemented method comprising: capturing, via a machine learning engine associated with a processor, a plurality of data records, each data record comprising at least two different types of input data for an entity having categorical variables and free-form textual data and associated properties received as graphical user interface (GUI) input fields on user interface elements of a graphical user interface of a requesting device; directing, via the machine learning engine, a first type of data corresponding to the free-form textual data to a natural language processor for deriving therefrom categorical and continuous attributes; feeding, via the machine learning engine, a defined set of demographical data to the natural language processor and combining an output of the categorical and continuous attributes with the demographic data to a candidate data store; directing, a second type of data corresponding to the categorical variables to a graph processor, to generate an entity graph also configured to receive an input of other prior data records and corresponding attributes to determine relationships in the entity graph and a comparison between common attributes of current and prior data records; feeding the entity graph to a graph convolutional network for determining common digital paths for the prior data records to reach a given state providing an entity graph output; and combining, in an ensemble model, the entity graph output and information retrieved from the candidate data store for providing a single output prediction of intelligent query responses comprising recommended visualization of recommended digital actions for the requesting device associated with a particular data record.

In at least one aspect, there is provided a non-transitory computer readable medium having instructions tangibly stored thereon, wherein the instructions, when executed cause a system to: capture, via a machine learning engine associated with a processor, a plurality of data records, each data record comprising at least two different types of input data for an entity having categorical variables and free-form textual data and associated properties received as graphical user interface (GUI) input fields on user interface elements of a graphical user interface of a requesting device; direct, via the machine learning engine, a first type of data corresponding to the free-form textual data to a natural language processor for deriving therefrom categorical and continuous attributes; feed, via the machine learning engine, a defined set of demographical data to the natural language processor and combining an output of the categorical and continuous attributes with the demographic data to a candidate data store; direct, a second type of data corresponding to the categorical variables to a graph processor, to generate an entity graph also configured to receive an input of other prior data records and corresponding attributes to determine relationships in the entity graph and a comparison between common attributes of current and prior data records; feed the entity graph to a graph convolutional network for determining common digital paths for the prior data records to reach a given state providing an entity graph output; and combine, in an ensemble model, the entity graph output and information retrieved from the candidate data store for providing a single output prediction of intelligent query responses comprising recommended visualization of recommended digital actions for the requesting device associated with a particular data record.

BRIEF DESCRIPTION OF THE DRAWINGS

These and other features will become more apparent from the following description in which reference is made to the appended drawings wherein.

DETAILED DESCRIPTION

Figure 1:
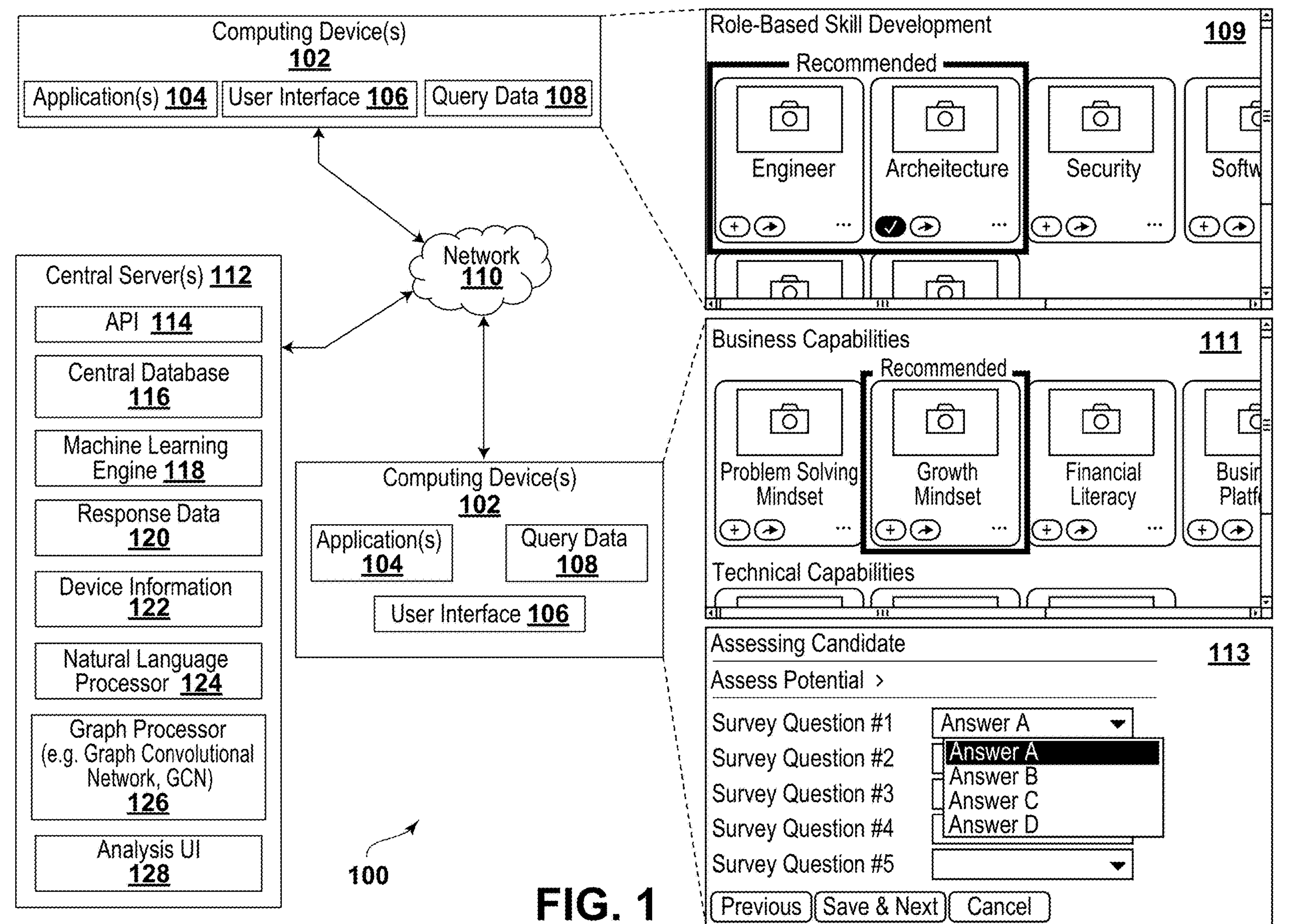
FIG. 1 illustrates a schematic block diagram of an example computerized system and architecture for handling multi modal input from various user interfaces of computing devices and applying machine learning techniques to generate intelligent computerized responses and actions to be rendered on user interfaces of the system, in accordance with various embodiments.

Generally, and referring to FIG. 1, there is shown a computerized environment 100 comprising one or more computing devices 102 and one or more central servers 112 communicating across a communication network 110. The computing devices 102 comprise one or more processors, a memory storing computer readable instructions, an operating system, and at least one or more applications 104 including survey applications for generating an interactive graphical user interface 106, including a plurality of output screens visually displayed on the user interface (e.g. shown as initial input screen 113 collecting survey data and subsequent screen views provided in response to central server 112 processing, shown as example screens of first output 109 and second output 111). The network 110 may include wired or wireless connections, such as Ethernet, Wi-Fi, cellular networks, or optical fibers, and can support various communication protocols, including TCP/IP, UDP, HTTP, and others. Additionally, the communication network 110 may incorporate routing, switching, and signaling mechanisms to manage data traffic efficiently and ensure reliable delivery of information between one or more computing devices 102 and central server 112 and other computing devices of the environment 100 (not shown).

Figure 2:
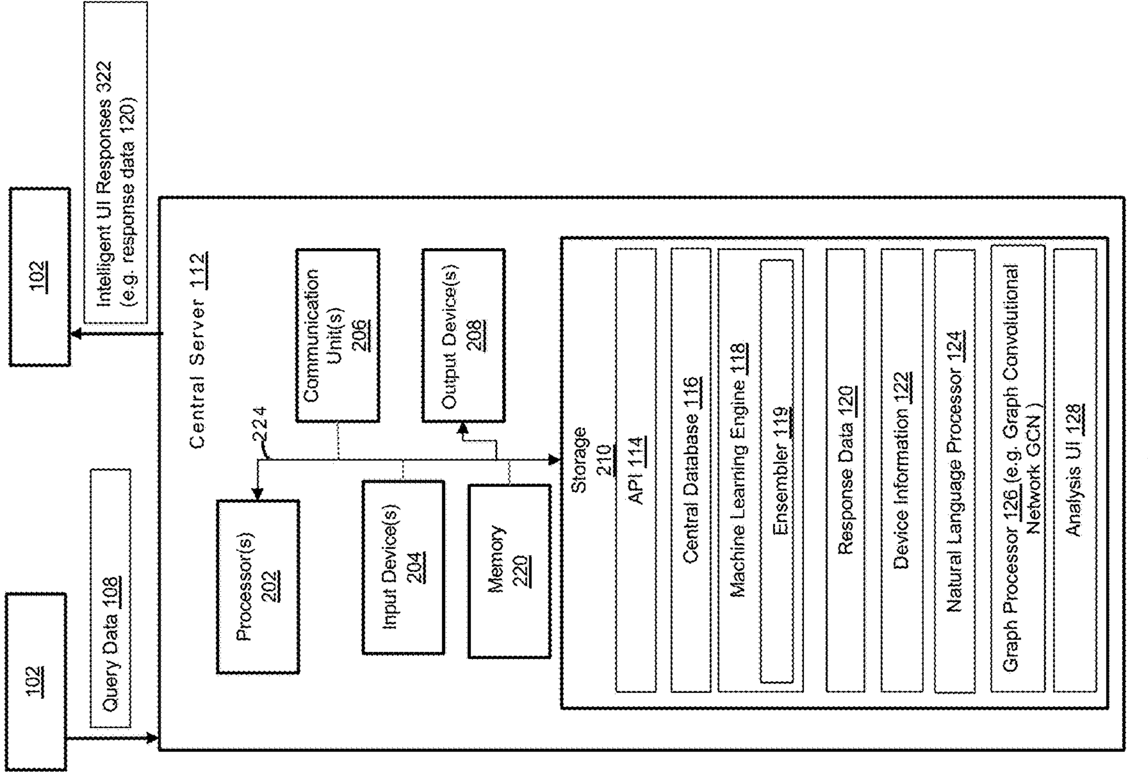
FIG. 2 illustrates an example block diagram of a central server for use in the system of FIG. 1 and exemplary computing components for providing machine learning operations including natural language processing to generate intelligent responses and associated graphical screens for displaying such responses via interactive screens in response to digital queries and surveys, in accordance with various embodiments.
Figure 3:
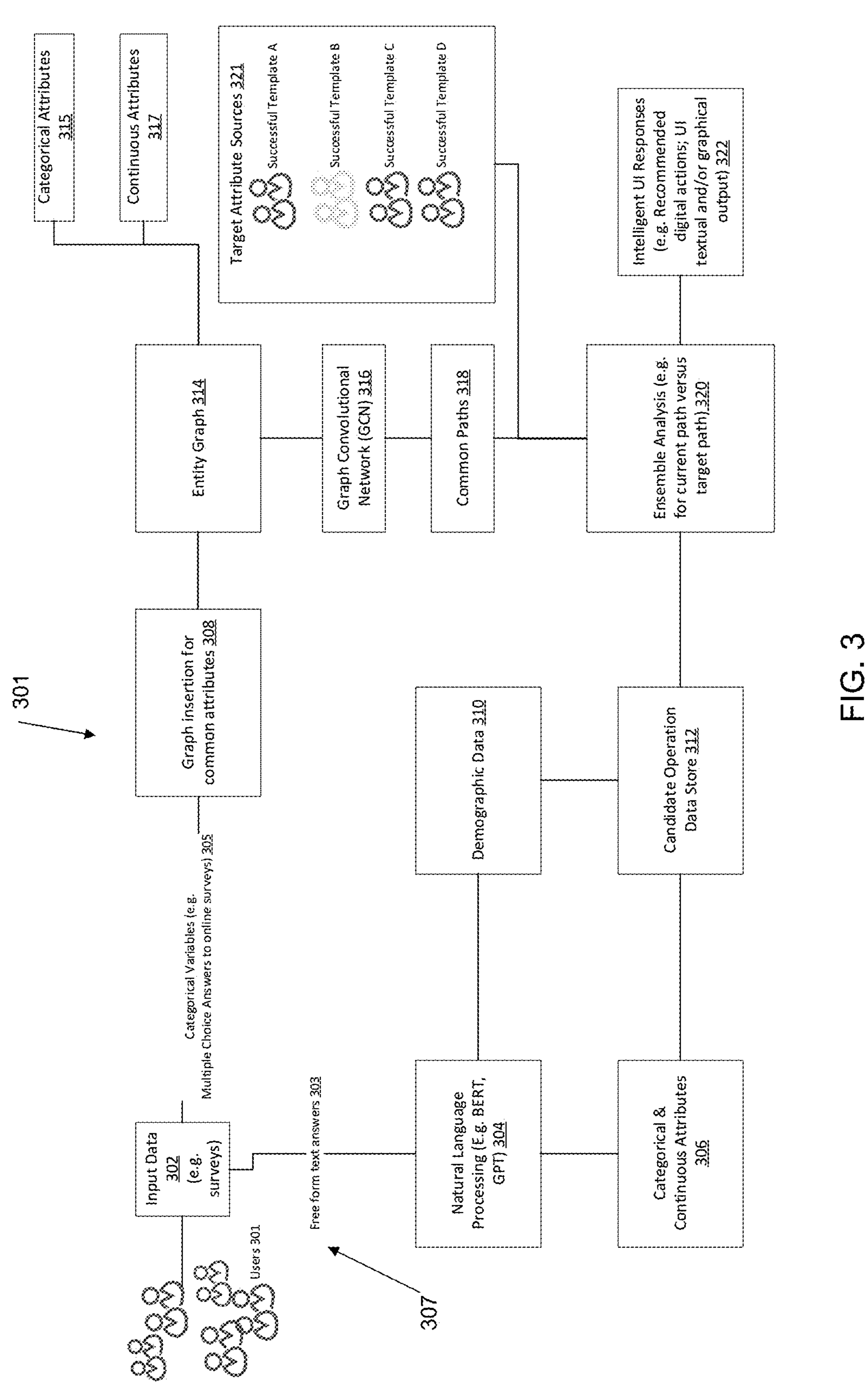
FIG. 3 illustrates a flowchart of an example flow of operations, as may be performed by the central server of FIGS. 1 and 2, for processing digital UI query and survey data via a machine learning based prediction engine for performing different types of predictive analysis on the input data based on the type of input data (e.g. free form text or categorical) and in accordance with various embodiments.
Figure 8:
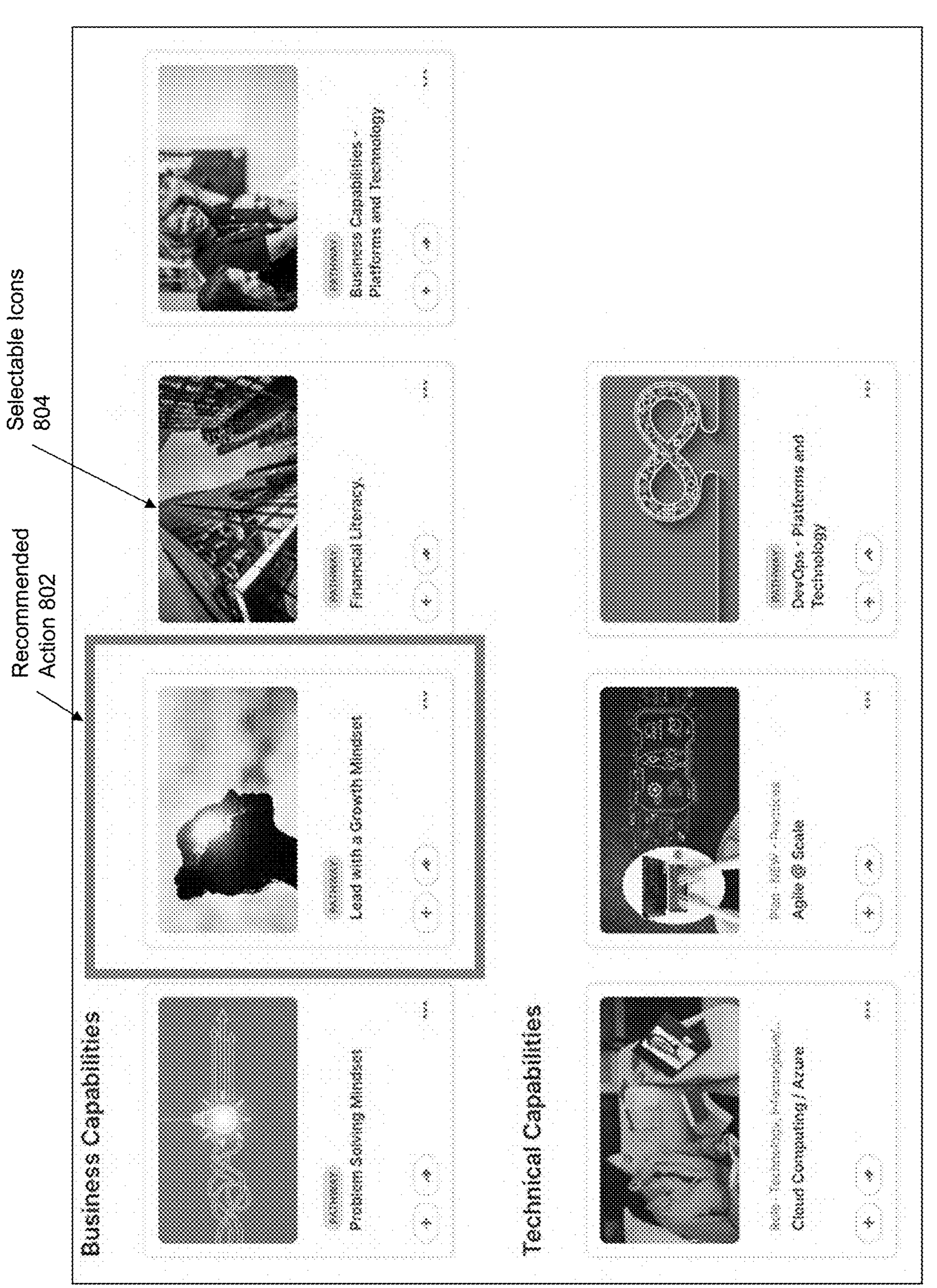
Figure 9:
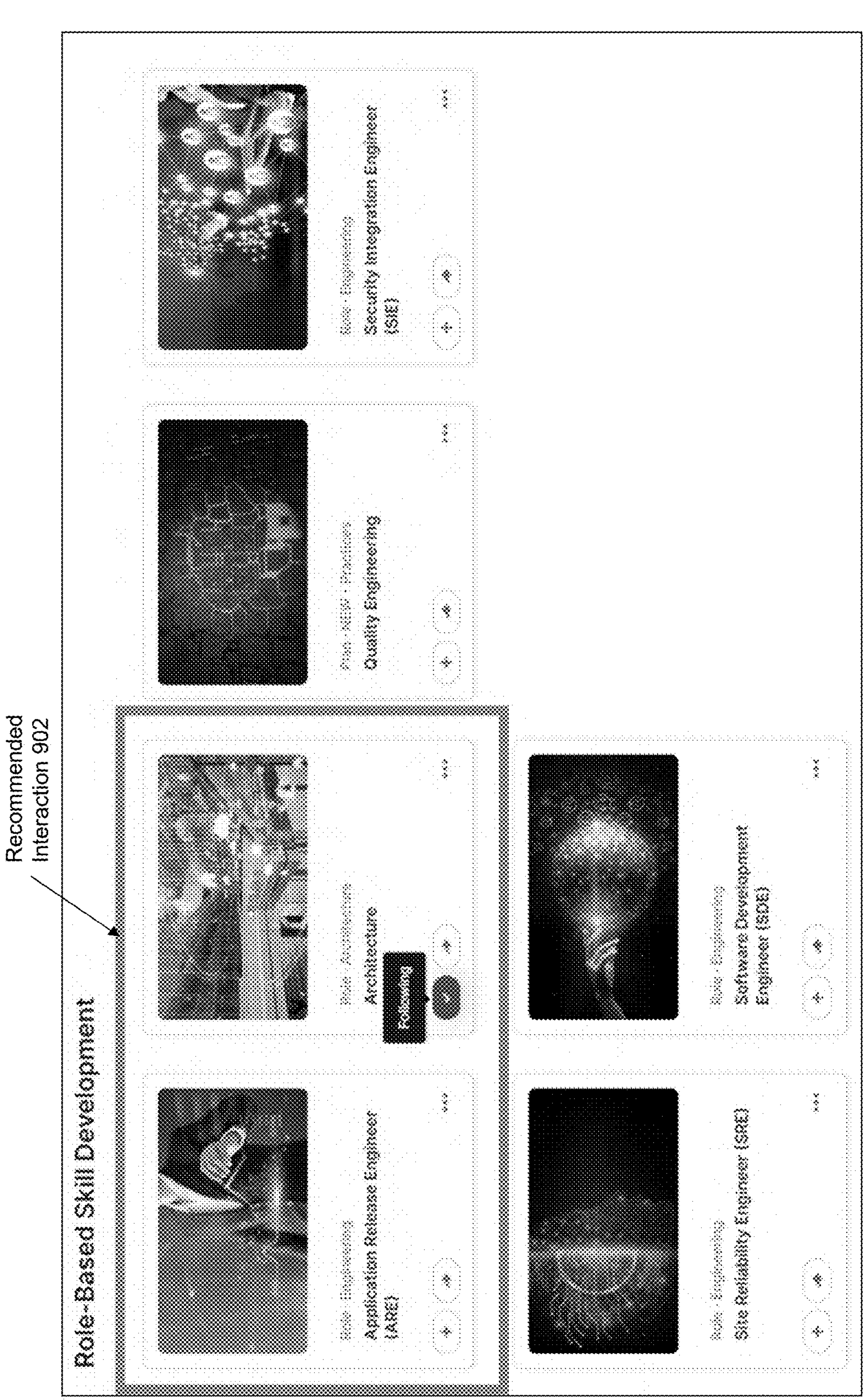
Figure 10:
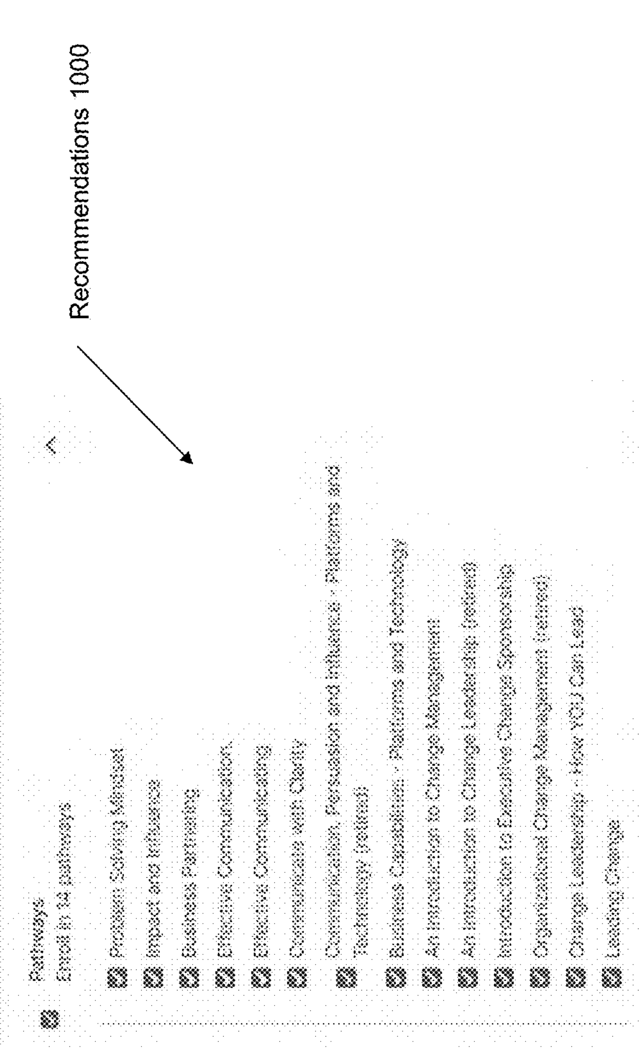

In turn, the central server 112 comprises one or more application programming interfaces (API) 114 which serve as an intermediary to allow different computing systems, applications, or services, such as between the computing device 102 and associated applications 104 to communicate with central server 112, and particularly machine learning engine 118 for UI content generation and dynamic content collection. The central server 112 further comprises a central database 116 configured to store data records corresponding to UI inputs and outputs, user attributes collected from various networked devices in the environment 100, including query data 108 containing inputs into the UI screens of computing devices 102 with reference to survey applications 104 and user interface 106 outputs. The database 116 may employ a schema that includes tables or data collection records to organize UI input data received across the communication network 110 as obtained on UI 106 and stored locally as query data 108, including user interactions, form submissions, and application 104 state changes, along with corresponding metadata such as device 102 identifiers, timestamps, and session IDs. Such device information relating to computing devices 102 and associated collected UI data from user interfaces 106 may also be stored separately as device information 122. Each UI input record, which may be stored on the computing device 102 as query data 108 and communicated across the network 110 (e.g. via either a push or pull mechanism) is associated with metadata to maintain data integrity and traceability and both stored on the central database 116 for all devices 102 communicating in the environment. Such query data 108 may include all UI inputs and interactions with one or more screens such as for the survey applications for use by the central server 112 as may be stored on the central database 116 for processing by the machine learning engine 118 to determine similarities, differences between the actions performed and thereby predict intelligent responses (e.g. response data 120) to the queries on the user interface 106, which may include GUI elements and textual content, shown in example screenshots as first output 109 and second output 111. The central server 112 further comprises a machine learning engine 118 which is configured to process multi modal information received as input UI data, (e.g. query data 108) and process such multi modal information along two different process flow paths (e.g. see FIG. 3) based on the type of UI input information being categorical or free form textual answers, such as to either perform natural language processing via a natural language processor 124 as a comparison to existing target attribute sources (e.g. determining based on demographical and/or categorical/continuous attributes other users having similar responses to survey questions as processed by the natural language processor 124) or to perform a series of graph processing operations via a graph processor 126 including entity graph generation which may be generated via an analysis user interface 128, a graph convolutional network generator and common path generator to then combine the output results of the two paths using an ensembler 119 as depicted in FIG. 2 to provide UI response outputs (e.g. see also Intelligent UI Responses 322 in FIG. 3), in the form of response data 120 which may include textual content, UI elements and UI screens to be communicated across the communication network to computing devices 102 for rendering thereon via the applications 104 such as via first output 109 and second output 111. Other example output screens are illustrated in FIGS. 8-10 providing specific tailored UI content based on the processing by the machine learning engine 118 of the central server 112. For example, the ensembler 119 may be configured to combine the predictions of multiple individual models, or as shown in FIG. 3, the predictions obtained via the two paths (e.g. a first path of operations 301 to handle categorical variables received as GUI inputs and second path of operations 307 to generate a single combined prediction). Referring to FIGS. 1-3, ensembling applied by the ensembler 119 (also see ensembler analysis 320 in FIG. 3) is advantageous because it yields more accurate predictions, leveraging predictions from two different types of input GUI data (e.g. applying natural language processing to one type of input including free form textual GUI inputs and graph analysis to categorical variable GUI inputs including Graph convolutional networks) to determine similarities to other data records having similar attributes thereby applying at least two different types of machine learning analysis specifically configured such as to improve on any single model used alone. Conveniently, the ensembling applied to the two different paths helps in reducing overfitting, increasing model generalization, and improving predictive performance by leveraging the strengths of different models.

Referring to FIGS. 1-3, the present disclosure relates generally and in at least some implementations, to a computerized system and environment 100 as illustrated in FIG. 1 for processing and deriving context from multiple modes of GUI input information, such as provided on interactive websites or other digital user interface 106 inputs (e.g. digital forms, interactive questionnaires, digital queries, surveys etc. such as may be received as UI inputs on example initial input screen 113) of computing devices 102 and processed using a combination of different machine learning algorithms and computing modules provided by a central server 112 including natural language processors, ensemble models and entity graph models which cooperate together in a specific computerized manner and utilize a customized computing architecture, to derive predictive insights from each of the multi modes of input data (e.g. as provided by one or more computing devices 102) and generate intelligent computerized responses (e.g. textual content, screen captures and links) to be displayed on user interfaces of one or more computing devices 102.

Example interactive digital screens are shown as a first output 109, and a second output 111 in FIG. 1 (which may be provided based on input survey or queries as shown in initial input screen 113) provided on user interfaces of computing devices 102 as triggered by central server 112 for displaying selectable icons with intelligent digital responses and actions including recommended actions based on the digital inputs and queries received on the computing devices 102 as collected by the central server 112 and communicated across a communication network 110 to computing devices 102 for presenting the set of digital responses as interactive icons including digital text, and digital actions on a user interface and/or automatically implementing the recommended actions derived from the digital insights. In at least some aspects, the multiple modes of information received on a user interface 106, collected as query data 108, of the computing devices 102 via application(s) 104 can include categorical variables or multiple choice inputs or input selected from a set of defined answers and/or free form textual input content such as sentence format or paragraphs or words and/or combination thereof obtained from a user interface input on the user interface 106 such as by way of digital queries, questionnaires, interactive surveys or other input interfaces for capturing such data (e.g. see example screenshot in FIG. 7).

Figure 6:
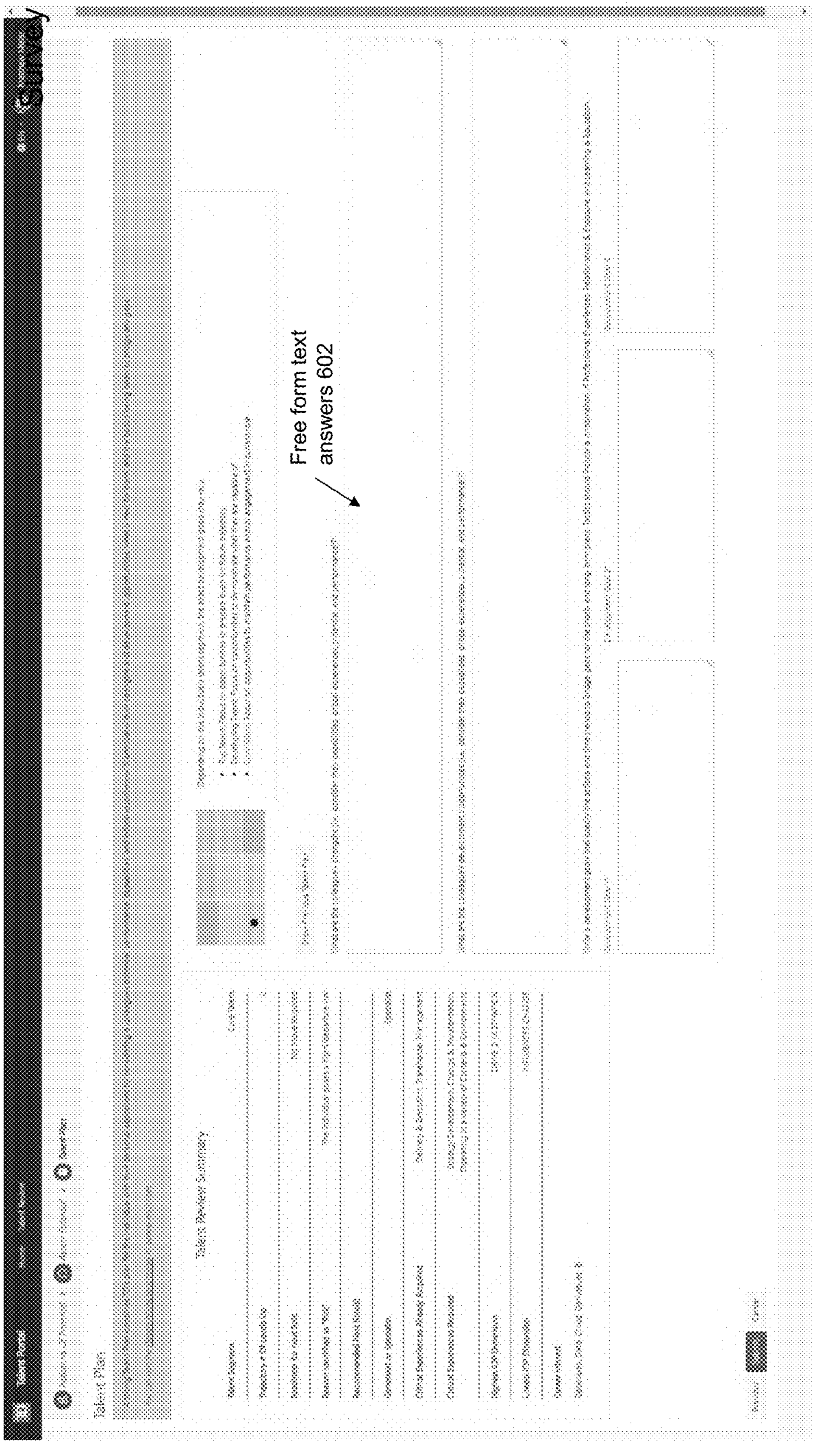
FIGS. 6-10 illustrate example user interface screens for display on one or more computing devices of FIG. 1 including GUI elements, content and selectable icons as generated by the machine learning based central server of FIG. 1 for display on one or more associated computing devices, in accordance with various embodiments.
Figure 7:
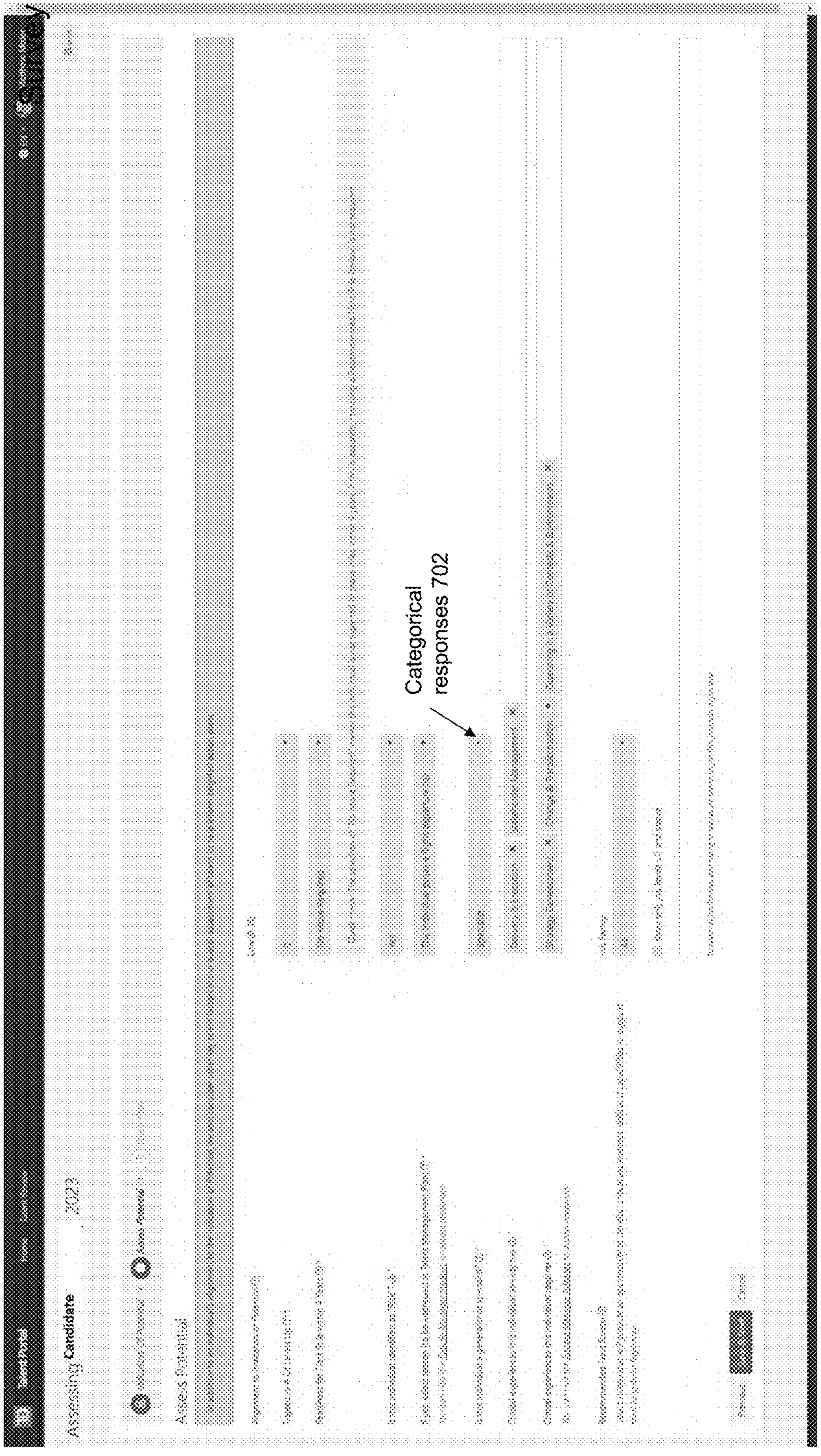

Generally, a digital query on a GUI survey refers to a question or prompt presented on computing devices in an electronic format (e.g. see initial input screen 113), typically through online survey platforms or mobile applications (e.g. applications 104) as may be displayed on the user interface 106. These GUI queries can encompass a wide range of formats, including textual input, multiple-choice questions, open-ended questions, rating scales, scales, dropdown menus, checkboxes, etc. which may be broken down as shown in FIG. 3 into categorical variables 305 or free form textual answers 303 to follow respectively a first path of operation 301 or a second path of operations 307. Example screens of free form and categorical survey inputs are illustrated in FIGS. 6 and 7.

In one aspect and referring to FIGS. 1-3, the applications 104 of the computing devices 102 may allow users to choose from a library of survey templates or create custom templates tailored to their specific needs. These templates incorporate interactive elements such as sliders, drag-and-drop functionality, and animated transitions to captivate attention.

In at least some aspects, the electronic surveys created using the applications 104 support the seamless integration of multimedia content, including images, videos, audio clips, and interactive widgets. This multimedia-rich environment enhances the clarity of survey questions and enables respondents to provide more nuanced and accurate responses as illustrated in the example screen shots of FIGS. 6 and 7.

In at least some aspects, there is provided a method and system as illustrated in FIG. 1 for generating interactive graphical user interfaces (GUIs) and corresponding content/screen elements/widgets for digital survey input and output of intelligent responses to the GUI inputs as shown in example screens of first output 109, and second output 111. For example, survey inputs provided on a user interface 106 of a computing device 102 (shown as initial input screen 113) are collected and processed by a central server 112 for applying machine learning systems via a machine learning engine 118 and natural language processor 124 to dynamically determine particular UI outputs based on survey content and GUI elements interacted with on the survey displayed on the user interface 106 (e.g. shown as initial input screen 113 collecting query data 108 for use by applications 104). The computing device 102 may further include at least one GUI generation module within applications 104 enabling the creation of digital surveys with customizable templates and multimedia integration. End users of computing device(s) 102 may interact with one or more of the GUI elements displayed as output of the user interface 106, such as sliders, drag-and-drop functionality, free form textual input fields and multimedia content, to provide survey inputs (e.g. as illustrated in initial survey query of initial input screen 113), which directly influence subsequent GUI presentation and survey flow (e.g. as illustrated in subsequent screens of first output 109 and second output 111, content of which triggered by machine learning performed on the central server 112). Moreover, adaptive GUI logic features provided by the applications 104 as triggered by the central server 112 based on processing the survey inputs (e.g. received on the initial input screen 113) dynamically adjust the GUI presentation outputs, such as provided in subsequent screens shown as first output 109 and second output 111 based on user inputs, tailoring the survey experience to individual respondent characteristics and responses. Real-time feedback mechanisms within the GUI provided as output of the user interface 106 provide users with progress indicators, completion milestones, and personalized messages, further influencing user inputs and engagement. In at least some aspects, an API (Application Programming Interface) 114 on a central server 112 facilitates the generation of user interfaces on one or more end devices such as computing devices 102 by providing a structured way for the central server 112 to communicate and interact with the computing device's 102 software.

When a request is made from the computing device 102 to the central server 112 across the communication network 110, typically via HTTP or HTTPS protocols, the API 114 processes the request, retrieves relevant data or instructions, and returns the necessary information to generate the user interface 106 and associated screens and GUI elements. This information can include GUI components, layout instructions, styling details, and content to be displayed on the device's screen as shown in first output 109 and second output 111.

Figure 5:
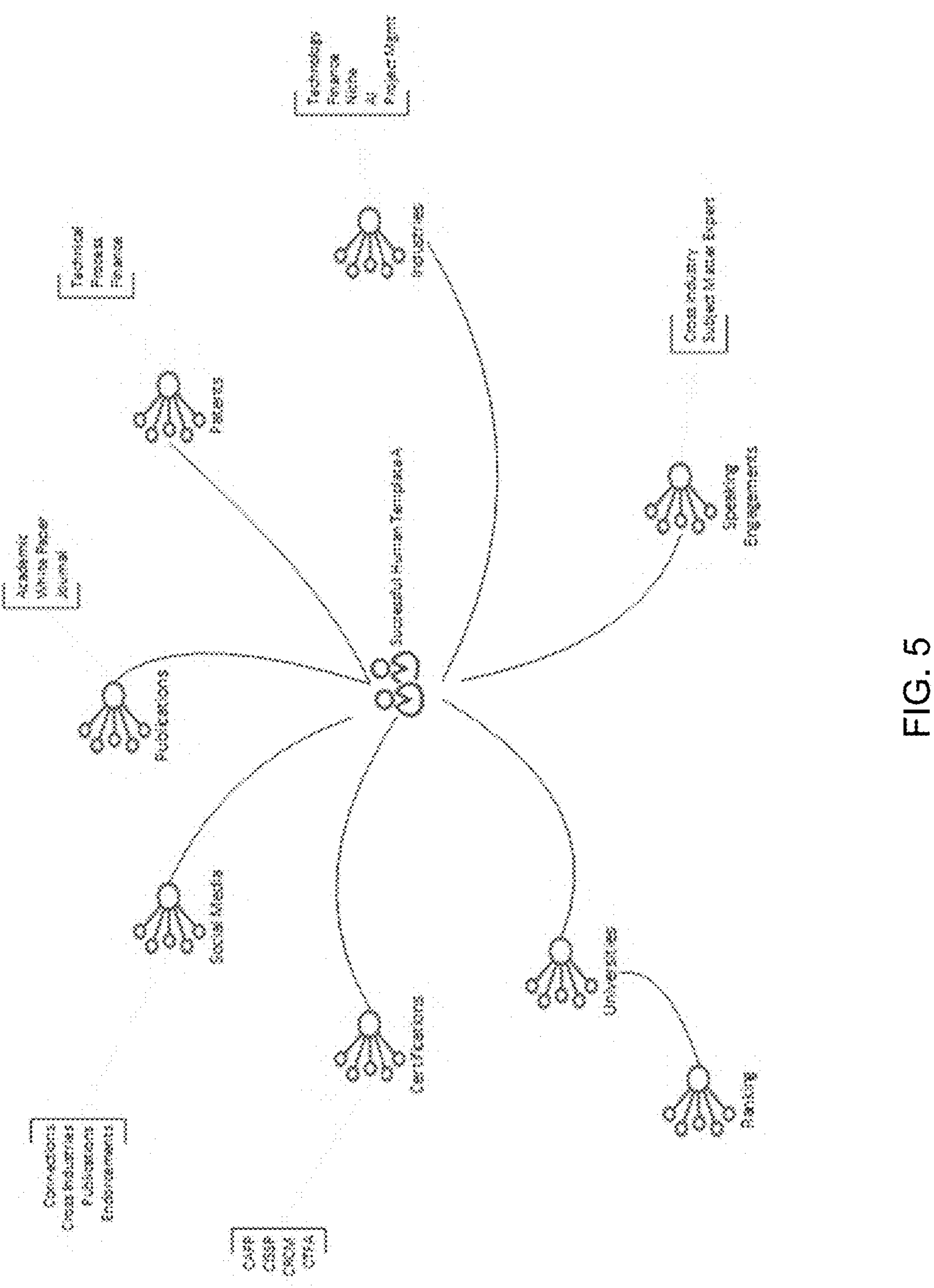
FIG. 5 illustrates an example output entity graph, as may be provided by the central server of FIG. 2, in accordance with various embodiments.

Conveniently, in at least some aspects, this facilitates enhanced user interface engagement, data quality, and insights generation on the user interface of the computing devices 102 across various survey applications 104 by dynamically shaping GUI outputs based on user inputs and survey content as processed via the machine learning engine 118 of the central server 112 and associated components including central database 116, ensembler 119, natural language processor 124, graph processor 126 (e.g. including a graph convolutional network), and analysis UI 128 for providing UI screens for use by the central server 112 such as displaying the entity graph illustrated in FIG. 5.

FIG. 2 is a diagram illustrating in schematic form the central server 112 and communications with the computing devices 102 including input UI query data 108 and output UI responses, shown as intelligent UI responses 322 (e.g. response data 120), in accordance with one or more aspects of the present disclosure.

In at least some aspects, the central server 112 provides visualization of input UI data and derives context from the UI data such as to build profiles for each input data record, visualizing insights derived from the context of the data in building profiles for the users using machine learning techniques as well as deriving and visualizing recommended actions for the user profile state to reach a desired target state.

In at least some aspects, such data visualizations may provide new perspectives of the data visualizations in such a manner that would not be evident in viewing the data alone. Additionally, in some aspects the data insight visualization and analysis for recommended actions as performed by the central server 112 is based on multi-dimensional types of input data provided in the query data 108, such as obtained from digital user interfaces 106 such as free form textual data (e.g. which does not follow any expected formats or content), and numerical or defined input responses such as multiple choice responses to questions (examples of which are illustrated in screen views of FIGS. 6 and 7. The process may include data integration, analysis including determining context of input text and data, application of various machine learning models for understanding different dimensions or aspects or formats of the data and profiling input records to other similar records such as to determine corresponding actions for a particular profile to reach a desired state and visualization of the path of actions, including the profiling information/context information on at least a part of a user interface providing a view of recommended actions and/or interactive options for selection of same. More specifically, the present disclosure relates, in at least some example aspects to integration, analysis and comparison to existing data record profiles, and visualization of data objects in comparison to existing data record profiles and corresponding insights derived therefrom in various contextual views.

Central server 112 comprises one or more processors 202, one or more input devices 204, a memory 220, one or more communication units 206 and one or more output devices 208. Central server 112 also includes one or more storage devices 210 storing one or more computing modules as described also in relation to FIGS. 1 and 3 such as API 114, central database 116, machine learning engine 118, ensembler 119, response data 120, device information 122, natural language processor 124, graph processor 126, and analysis UI 128.

Communication channels 224 may couple each of the components illustrated in FIG. 2 for inter-component communications, whether communicatively, physically and/or operatively. In some examples, communication channels 224 may include a system bus, a network connection, an inter-process communication data structure, or any other method for communicating data.

One or more processors 202 may implement functionality and/or execute instructions within central server 112. For example, processors 202 may be configured to receive instructions and/or data from storage devices 210 to execute the functionality of the modules shown in FIG. 2, among others (e.g. operating system, applications, etc.) such as to perform machine learning based analysis on multi modal UI data based on a specific flow of operations (e.g. as shown in FIG. 3) to determine UI outputs and digital actions to be performed on the UI (e.g. as shown in example screen shot of FIGS. 8-10). Central server 112 may store data/information to storage devices 210 and to central database 116 such as query data 108, response data 120, device information 122 identifying devices 102, and outputs from machine learning engine 118, natural language processor 124, graph processor 126 and analysis UI 128. Some of the functionality is described further herein.

One or more communication units 206 may communicate with external devices via one or more networks (e.g. communication network 110 of FIG. 1) by transmitting and/or receiving network signals on the one or more networks. The communication units may include various antennae and/or network interface cards, etc. for wireless and/or wired communications.

Input and output devices may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 224).

The one or more storage devices 210 may store instructions and/or data for processing during operation of the central server 112 and particularly machine learning engine 118 and associated components including natural language processor 124, graph processor 126 and analysis UI 128. The one or more storage devices may take different forms and/or configurations, for example, as short-term memory or long-term memory. Storage devices 210 may be configured for short-term storage of information as volatile memory, which does not retain stored contents when power is removed.

Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Referring again to FIG. 2, it is understood that operations may not fall exactly within the modules depicted such that one module may assist with the functionality of another.

Referring to FIGS. 1-3, in at least some aspects, there is provided a multi-modal machine learning based analysis system, method and computing environment, such as shown in FIG. 1 (and central server 112 for machine learning based prediction as shown in FIG. 2 and implementation in the method flow diagram of FIG. 3) for determining context of multi-modes of input data (e.g. categorical variables 305 or free form text answers 303) from data records of input data 302 and performing computerized data visualizations and graph analysis on one type of the data (e.g. see first path of operations 301) for relationship determination to similar prior data and natural language processing on a second other type of the input data (e.g. see second path of operations 307) such as to collectively perform ensemble analysis (e.g. via ensemble analysis 320) on the two types of processed data derived from the two paths and determine therefrom data visualizations of the resulting insights derived from each type of data once ensembled and provide intelligent computerized responses, shown as intelligent UI responses 322 to the inputs received on the user interface, including screen views of recommended digital actions relating to the responses, which may be viewed by a user on an electronic device. Data rendered in the computerized visualization may comprise data objects and associated properties and/or metadata including digital web links or application links to initiate the recommended actions, as shown in first output 109 and the second output 111 as illustrated in FIG. 1.

In at least some aspects and with reference to FIGS. 1-3, the recommended output digital actions (e.g. web links, links to other digital views of the user interface, links to initiate other applications, etc.) provided in the data visualizations as shown in the intelligent UI responses 322 of FIG. 3 (or response data 120 of FIG. 1) provides a holistic view of the multiple dimensions or aspects of the input data 302 (e.g. also see query data 108 of FIG. 1) to generate a profile and associated attributes such as state for the particular data record processed and provides a comparison to other prior profiles of data records and associated state for the data record to derive insights for the recommended digital actions, for rendering on one or more computing devices 102 via user interface 106 such as that shown in the first output 109 and the second output 111.

Figure 4:
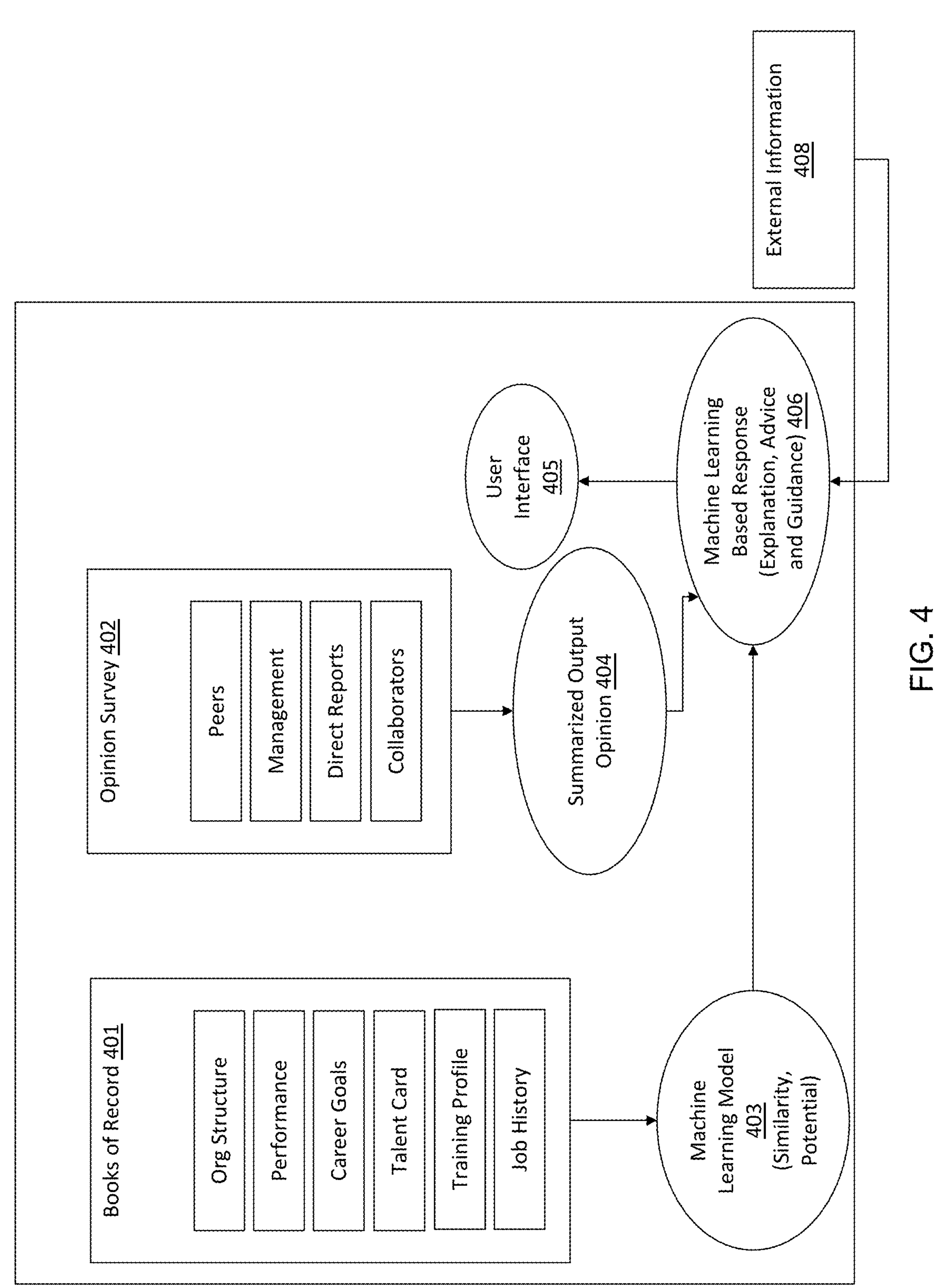
FIG. 4 illustrates a flowchart of an example use case applying digital record data to a machine learning based prediction engine as provided by the central server of FIG. 2 (utilizing a system of machine learning models including natural language processing, similarity and potential) for generating a user interface visualization of recommended predicted actions based on the input data (e.g. as collected in the user interface system of FIG. 1) and in accordance with various embodiments.

Referring now to FIG. 4, there is illustrated a flow chart of an example use case of applying the machine learning engine 118 and associated computerized components of the central server 112 for processing UI inputs and performing machine learning based data visualization, analysis and intelligent UI response including recommended UI action prediction provided by the machine learning models provided via the machine learning engine 118, the natural language processor 124, the graph processor 126 and/or the analysis UI in cooperation with the central database 116.

Referring to FIG. 4, in the example use case where input data records relate to employee data and profile attributes such as current job state of the user, then the data records may include textual content such as objective internal opinions collected via an electronic opinion survey 402 on strengths and weaknesses. The data records relating to internal opinions may be combined in a machine learning model 403 of the machine learning engine 118 to summarize for a particular record, by way of a summarized output opinion 404 for a user, e.g. employee. Another source of input data to be analyzed in this example use, may relate to employer data records such as internal information provided in the books of record 401 including but not limited to: a historical view of similar employees' performance, career paths, talents, skills, etc., as may be stored in one or more data records and captured from interactions with associated computing devices (e.g. computing device 102 of FIG. 1 communicating via UI 106 across the communication network 110).

Yet another source of data to be analyzed by the machine learning engine 118 to generate machine learning based response 406 includes external information 408 fed into the machine learning models to process data including but not limited to: skill testing and personality testing, etc. As illustrated in FIG. 4, this data may be combined with internal information by the machine learning engine 118 which includes the machine learning model 403.

Combining the above operations, in one example implementation performed by the central server 112 to provide objective digital advice and/or guidance in the form of UI outputs on a user interface 405 of FIG. 4 to end users of computing devices 102 illustrated in FIG. 1 via a data visualization interface such as a graphical user interface creator module, such as for desired goals or end states of users, as well as generating by utilizing one or more natural language processors, textual output of areas for focus (gaps) to achieve desired state.

As will be described, the machine learning engine 118 may utilize one or more computing modules of FIGS. 1 and 2 to apply various machine learning processes including but not limited to deep learning, natural language processing, convolutional networks, ensembling techniques, etc.

One example aspect of input data may include digital survey inputs, e.g. opinion survey 402 including textual opinions captured on digital views of a native digital user interface experience which collects a comprehensive multi-rater assessment on how users rate capabilities as compared to a benchmark. However, other types of captured user interface data having multiple modes or dimensions may be envisaged including categorical data and free form textual data, tabular data or other forms thereof.

Other types of input data captured may include ratings relating to users, such as captured via computing devices 102 shown in FIG. 2 from different categories of entities. The input data may, in some aspects, be used as input to random forest model such as a Pearson user-based correlation model.

In some aspects, the machine learning model output variables provided by the machine learning model 403 including similarity and potential may be used by the machine learning engine 118 to further determine how to improve a current status for an entity and thereby change a given state.

In at least some aspects, feature vectors describing low and high-rated categories may be used for future decisions.

In at least some aspects, as illustrated in FIGS. 1-4, a machine learning engine 118 is applied onto one type of input data record, e.g. on internal Information, to build and continuously update profile attributes (e.g. progression patterns, status, performance, etc.) based on current user behavior.

In at least some aspects, the machine learning engine 118 may apply an un-supervised learning to the input data that creates k-means clusters with other data points, e.g. users of similar profile attributes and utilize the clusters for anomaly and recommendation scoring.

In at least some aspects, the outcomes provide indicators of similarity and indicators of potential to users as output.

Referring to FIG. 4, the output of the machine learning engine 118 may be provided to a machine learning model 403, which includes a set of features describing similarity and potential.

In the example of FIG. 4, a combination of a first set of data having one type, e.g. external personality data and external skills data; and data from internal models, e.g. ratings and similarity information is fed to a machine learning model 403 which provides guidance to users based on their Pearson user-based correlation to what others have done.

The combination of the two results in a data visualization with context data to be delivered to a user interface. In one example implementation, this may include details on changing the status or state of a user from an initial state, e.g. key areas of focus, as well as critical areas to focus on, e.g. weakness/requires attention.

In at least some implementations, the input data is multi modal (graph, textual, underlying structures) and applies machine learning systems and methods to determine how patterns emerge, as per the machine learning model 403.

In at least some aspects and referring to FIGS. 1-4, natural language processing may be applied, to derive insight from observations and the results are fed into an operational data store which in turn gets ensembled with the graph data (e.g. from the entity graph).

Referring to FIG. 3, there is illustrated an example flow of operations performed by the central server 112 and particularly, the machine learning engine 118 in cooperation with other computing components of FIGS. 1 and 2 including the natural language processor 124, the graph processor 126, the analysis UI 128, the API 114, the central database 116, the ensembler 119 to generate response data 120 (also shown as intelligent UI responses 322 in FIG. 3) based on the received query data 108 input as multi modal UI input on one or more UI screens (e.g. surveys, forms, etc.) of a user interface 106 of a computing device 102.

Referring again to FIG. 3, example input data 302 may be in the form of an online survey with various UI input fields and elements for gathering textual content or selecting predefined drop down options (e.g. as provided on various input fields of initial input screen 113) and may be a comprehensive multi-rater assessment with multiple choice, yes or no, etc. and free form text or data as may be collected from a variety of computing devices 102 across the network illustrated in FIG. 1. This information is fed into 2 downstream operational aspects performed by the machine learning engine 118, shown as a first path of operations 301 and a second path of operations 307 for performing different machine learning operations to derive intelligent responses from the UI inputs based on whether categorical variables 305 are present in the data or free form text answers 303.

Referring to the second path of operations 307, free form text answers 303 such as long-form answers proceed through a customized natural language processing 304 (NLP) specifically configured for determining context and performing comparison utilizing bidirectional encoder representations (BERT), or embeddings from language model (ELMO), or Open AI, Azure Cognitive Services, etc. The output is contextualized and classified as UI questions or responses, providing category recognition and output. The following steps are then performed by the machine learning engine 118 in cooperation with various computing components of the central server 112 in FIG. 2. In at least some aspects, the machine learning engine 118 may orchestrate operation of one or more components of the central server 112 in FIG. 2 to perform the various operations of FIG. 3. An example of a user interface screen having a series of UI fields and questions for collecting free form textual inputs to each question (e.g. of an online survey) for display on the UI of the computing device 102 is illustrated in FIG. 6 for communication to the central server 112 for further processing and analysis as illustrated in FIG. 3.

1. Output of natural language processing 304 is processed into NLP attributes broken down into categorical and continuous attributes. Such NLP attributes may be derived via a comparison of prior stored data on the central database 116 of other entities and associated attributes to determine similarities with prior UI inputs in a given demographic state (obtained from demographic data 310). Examples of categorical attributes represent qualitative data that falls into specific, predefined categories or groups. Examples of continuous attributes represent quantitative data that may take any numerical value within a range. In a GUI survey, continuous attributes might include fields where respondents on a user interface input numeric values directly. The following provides examples of categorical and continuous variables based on a specific use case.
   i. Categorical: Myers Briggs type indicator, big 5 personality traits, success finder, Gartner, understand myself, etc.
   ii. Continuous: Skill tests, IQ, Emotional Intelligence, and other scores from internal or external 'tests'.
2. In at least some aspects, the natural language processing 304 may output other attributes derived such as demographic data 310 (approximate age, tenure, job level, career objective, etc.) and added to categories of attributes including context, classifications, etc. from the natural language processing 304.

In at least some aspects, the categorical and continuous attributes 306 and the demographic data 310 may be derived by the natural language processing 304 by comparing to prior data records of GUI inputs and demographic/attribute data.

3. In at least some aspects, the demographic data 310 and the categorical and continuous attributes 306 are fed into a candidate operation data store 312, which represents the profile of each candidate or entity and associated attributes.

In at least some aspects, such demographic data and categorical/continuous attributes may be collected by the machine learning engine 118 for all GUI input data on a particular survey UI collected as query data 108 as illustrated in FIGS. 1-2 for a plurality of computing devices 102, and may serve as a subsequent basis for the machine learning engine 118 to perform a comparison as to how similar GUI inputs or answers to questions are to a desired target state for another entity.

In this case, the machine learning engine 118 may apply the natural language processing 304 as a comparative tool, e.g. given a set of attributes from the candidate and the demographics, how similar are the UI input answers as processed by the NLP 304 to other stored answers of other entities having a desired target state for the entity (e.g. having common demographics).

Referring again to FIG. 3, a first path of operations 301 processes input data 302 (e.g. electronic survey data) having a second data type, e.g. in the form of categorical variables 305 (e.g. multiple choice answers to online surveys). An example of a user interface displayed on one or more computing device 102 for collecting categorical UI input data, e.g. multiple choice or drop downs is illustrated in the example screen view of FIG. 7. As described earlier, the collected input data may be gathered as the query data 108 and communicated to the central server 112 for processing by the machine learning engine 118 as per the operations in FIG. 3. The machine learning engine 118 is configured for determining and visualizing common attributes shown as graph insertion for common attributes 308 and the result is fed to an entity graph 314, e.g. an entity distance model (also being provided categorical attributes 315 and continuous attributes 317) and applies a graph convolutional network (GCN) 316 to visually illustrate the relationships on the graph. An example entity graph is illustrated in FIG. 5.

Thus, in at least some aspects, categorical variables 305 (e.g. Numerical, multiple choice, y/n, and other categorical variables/responses) are inserted into an entity graph 314 via graph insertion for common attributes 308 for the purposes of comparison between common attributes of given candidates which may be displayed.

The entity graph 314 of FIG. 3 may be a graphical representation of entities and the relationships between them in an input dataset. The entity graph 314 may illustrate entities as nodes and their relationships as edges connecting these nodes. Entities represent real-world objects or concepts, while relationships describe how these entities are connected or interact with each other.

Referring again to FIG. 3, the entity graph 314 is then fed, via the machine learning engine 118 into a graph convolutional network 316 which also considers the end defined state of the user, e.g. end state of the candidates, as well as process paths taken by others, such as digital journeys of other entities currently in desired state. The graph convolutional network (GCN) 316 determines distance between entities on the entity graph 314 such as to indicate how similar two entities are. This may be used by the machine learning engine 118 to determine distance from one entity at a given current state to another entity having a desired state for the first entity to achieve.

As illustrated in FIG. 3, the entity graph 314 may be processed by the machine learning engine 118 to utilize the graph convolutional network 316 results to determine the common paths 318 traversed by other entities of interest. For example, common paths 318 as may be traversed by others, e.g. various entities having a desired state and detected by GCN 316. The entity graph 314 generation may be performed by the graph processor 126 to generate an analysis user interface (UI) 128 as shown in FIG. 2. FIG. 5 illustrates an example of an entity graph 314 which may be generated by the graph processor 126 and/or analysis UI 128 having an example of a successful path of operations taken by a candidate of a computing device 102 and associated characteristics or attributes.

Referring again to FIG. 3, the candidate profiles stored in the candidate operation data store 312 generated for predicted outputs based on a first data type and the common paths 318 derived from the entity graph 314 processing providing predictions for a second data type are fed to an ensemble model (e.g. ensembler 119 of FIG. 2) for performing ensemble analysis 320 to provide output feedback in the form of intelligent UI responses 322. Such intelligent UI responses 322 may include recommended digital action; UI textual and/or graphical outputs to determine for example digital links to resources, textual content explaining the path to achieve the target state for the candidate and other recommended digital actions to be taken by a user of the user interface to progress states to a different state as may be known from other entity states. Examples of screens triggered by the machine learning engine 118 containing the intelligent UI responses 322 are illustrated in FIGS. 8 and 9, illustrating a set of selectable graphical icons indicating resources to be accessed and operations to be performed to achieve a desired target state. The ensemble model may alternatively utilize random forest or decision tree or other such ensembling techniques to combine results from the two paths illustrated in FIG. 3. Put another way, the ensemble analysis 320 may consider all of the common path 318 attributes and associated attribute elements from the entity graph (e.g. see FIG. 5) as well as demographics derived from natural language processing 304 and associated categorical and continuous attributes 306 and combine them into the ensemble analysis such as to predict a set of recommended digital actions to be performed on the user interface 106 to strengthen the input attributes and cover the gaps to achieve a desired target state of one or more other entities.

As illustrated in FIGS. 8 and 9, such output UI results may be generated by the central server 112 for display on the UI 106, and provide directed GUI action steps to result in an entity's desired state. For example, as illustrated in FIG. 8, the graphical user interface 106 of FIG. 1 allows rendering and interaction with selectable icons displayed on a computer screen of the computing device 102. Such selectable GUI icons, textual content, web links and associated GUI metadata for presentation on the user interface 108 may be provided via the response data 120 provided from the central server 112 via the machine learning engine 118. The user interface screens presented as shown in FIGS. 8 and 9 enable users to engage with icons through a series of actions, including highlighting, hovering, and clicking the visual icons shown as selectable icons 804. Additionally, as shown in FIG. 8, the screen generated by the user interface 106 may include the response data in a visual manner such as by highlighting or visually accentuating recommended actions 802 or recommended interaction 902. Upon interaction with the icons, such as the recommended actions 802, the user interface 106 provides visual feedback to indicate selection and triggers corresponding computing events based on the selected icon. These events may include navigating to a new web page within an application or initiating the download of applications or resources.

FIG. 10 illustrates an example screen view of another intelligent response generated by the central server 112 and machine learning engine 118 following the process of FIG. 3, such as to include selectable GUI icons providing recommended actions to pursue digital resources shown as a set of recommendations 1000 (e.g. selectable visual icons or widgets). As will be envisaged, selection of such digital resources may initiate downloading such resources onto the computing device 102 and/or processing the resources online such as via web links such that completion of such resources may further be communicated back to the central server 112 of FIG. 1 for updating status for the associated profile.

Referring to the GUI output screens of FIGS. 8-10 generated as a result of processing the GUI inputs such as displayed on FIGS. 6-7 containing free form text answers 602 and categorical responses 702 via the machine learning based central server 112 (e.g. operations as described with reference to FIG. 3). As illustrated on the output screens of FIGS. 8-10, users of the computing device 102 of FIG. 1 engage with icons and particularly recommended GUI icons, provided in response to response data 120 (e.g. recommended actions 802, recommended interaction 902) through various input modalities such as highlighting, hovering, or clicking, for triggering subsequent events. Upon interaction, these icons initiate transitions to subsequent screens, altering the displayed content or initiating specific processes on the computing device 102. This sequential progression is facilitated by the dynamic nature of the GUI 106, wherein user actions on one screen dictate the display or behavior of subsequent screens on the computing device 102. The user interface 106 manages these transitions and based on the response data 120/intelligent UI responses 322 configuring the output screen elements (e.g. selectable icons 804) and ensuring seamless user interface interactions across multiple screens within the graphical interface environment.

One or more currently preferred embodiments have been described by way of example. It will be apparent to persons skilled in the art that a number of variations and modifications can be made without departing from the scope of the disclosure as defined in the claims.

The invention claimed is:

1. A computer implemented system comprising:

an electronic data store comprising a plurality of data records, each data record comprising at least two different types of input data for an entity, wherein the at least two different types of input data comprise categorical variables and free-form textual data and associated properties received as graphical user interface (GUI) input fields on user interface elements of a GUI of a requesting device;

one or more hardware processors in communication with a computer readable medium storing software instructions that are executable by the one or more hardware processors in order to cause the computer implemented system to:

direct a first type of input data corresponding to the free-form textual data to a pre-trained natural language processor and deriving therefrom categorical and continuous attributes via the pre-trained natural language processor, wherein the pre-trained natural language processor comprises one or more pre-trained language models that applies at least one of an Embedding from Language Model (ELMO) or Bidirectional Representations from Transformers (BERT) to derive the categorical and continuous attributes;

feed a defined set of demographical data to the pre-trained natural language processor and combine an output of the derived categorical and continuous attributes with the defined set of demographic data to a candidate data store;

direct a second type of input data corresponding to the categorical variables to a graph processor to generate an entity graph also configured to receive an input of other prior data records and corresponding attributes to determine relationships in the entity graph and a comparison between common attributes of current and prior data records;

feed the entity graph to a graph convolutional network and determining determine common digital paths for the prior data records to reach a given state providing an entity graph output via the graph convolutional network; and combine the entity graph output and information retrieved from the candidate data store using a machine learning ensemble model to provide a single output prediction of intelligent query responses comprising recommended visualization of recommended digital actions for the requesting device, wherein the machine learning ensemble model applies one of random forest modelling and decision tree modelling to combine results of outputs from processing each of the first and second types of input data via the pre-trained natural language processor and graph convolutional network respectively.

2. The system of claim 1, wherein the software instructions are executable by the one or more hardware processors to further cause the computer implemented system to: in response to receiving a user input selecting the recommended digital action, presenting a digital resource for performing the recommended digital action on a display screen of the requesting device.

3. The system of claim 1, wherein the graph convolutional network receives as input both an end desired state of the entity, wherein the end desired state is associated with a current data record and derived from the input data received on the user interface elements of the GUI and prior data records of other entities currently at a given state matching the end desired state.

4. The system of claim 1, wherein the candidate data store stores profiles of a plurality of candidates and associated attributes.

5. The system of claim 1, wherein the software instructions executable by the one or more hardware processors are further configured to cause the computer implemented system to: utilize the pre-trained natural language processor to categorize the free-form textual data into categorical and continuous attributes.

6. The system of claim 1, wherein the one or more pre-trained language models provide context to textual inputs received by applying surrounding text in a given sentence of the free-form textual data to establish said context.

7. The system of claim 3, wherein the instructions executable by the one or more hardware processors are further configured to cause the computer implemented system to: generate the single output as a set of selectable GUI elements providing access to computer resources for modifying attributes associated with a current state of the entity to achieve the end desired state of the entity.

8. The system of claim 1, wherein the instructions executable by the one or more hardware processors are further configured to: receive feedback input to modify categorization of attributes into the categorical and continuous attributes as provided by the pre-trained natural language processor, thereby refining classifications of categories of attributes from the pre-trained natural language processor for subsequent iterations based on the feedback input.

9. A computer implemented method comprising:

capturing, via a machine learning engine associated with a processor, a plurality of data records, each data record comprising at least two different types of input data for an entity, wherein the at least two different types of input data comprise categorical variables and free-form textual data and associated properties received as graphical user interface (GUI) input fields on user interface elements of a GUI of a requesting device;

directing, via the machine learning engine, a first type of input data corresponding to the free-form textual data to a pre-trained natural language processor and deriving therefrom categorical and continuous attributes via the pre-trained natural language processor, wherein the pre-trained natural language processor comprises one or more pre-trained language models that applies at least one of an Embedding from Language Model (ELMO) or Bidirectional Representations from Transformers (BERT) to derive the categorical and continuous attributes;

feeding, via the machine learning engine, a defined set of demographical data to the pre-trained natural language processor and combining an output of the derived categorical and continuous attributes with the defined set of demographic data to a candidate data store;

directing, a second type of input data corresponding to the categorical variables to a graph processor, to generate an entity graph also configured to receive an input of other prior data records and corresponding attributes to determine relationships in the entity graph and a comparison between common attributes of current and prior data records;

feeding the entity graph to a graph convolutional network and determining common digital paths for the prior data records to reach a given state providing an entity graph output via the graph convolutional network; and combining, using a machine learning ensemble model, the entity graph output and information retrieved from the candidate data store to provide a single output prediction of intelligent query responses comprising recommended visualization of recommended digital actions for the requesting device, wherein the machine learning ensemble model applies one of random forest modelling and decision tree modelling to combine results of outputs from processing each of the first and second types of input data via the pre-trained natural language processor and graph convolutional network respectively.

10. The computer implemented method of claim 9, wherein in response to receiving a user input selecting the recommended digital action, the method comprises presenting a digital resource for performing the recommended digital action on a display screen of the requesting device.

11. The computer implemented method of claim 9, wherein the graph convolutional network receives as input both an end desired state of the entity, wherein the end desired state is associated with a current data record and derived from the input data received on the user interface elements of the GUI and prior data records of other entities currently at a given state matching the end desired state.

12. The computer implemented method of claim 9, wherein the candidate data store stores profiles of a plurality of candidates and associated attributes.

13. The computer implemented method of claim 9, further comprising utilizing the pre-trained natural language processor to categorize the free-form textual data into categorical and continuous attributes.

14. The computer implemented method of claim 9, wherein the one or more pre-trained language models provide context to textual inputs received by applying surrounding text in a given sentence of the free-form textual data to establish said context.

15. The computer implemented method of claim 11, further comprising generating the single output as a set of selectable GUI elements providing access to computer resources for modifying attributes associated with a current state of the entity to achieve the end desired state of the entity.

16. The computer implemented method of claim 9 further comprising receiving feedback input on a second user interface associated with the machine learning engine to modify categorization of attributes into the categorical and continuous attributes as provided by the pre-trained natural language processor, thereby refining classifications of categories of attributes from the pre-trained natural language processor for subsequent iterations based on the feedback input.

17. A non-transitory computer readable medium having instructions tangibly stored thereon, wherein the instructions, when executed cause a computerized system to:

capture, via a machine learning engine associated with a processor, a plurality of data records, each data record comprising at least two different types of input data for an entity, wherein the at least two different types of input data comprise categorical variables and free-form textual data and associated properties received as graphical user interface (GUI) input fields on user interface elements of a GUI of a requesting device;

direct, via the machine learning engine, a first type of input data corresponding to the free-form textual data to a pre-trained natural language processor and deriving therefrom categorical and continuous attributes via the pre-trained natural language processor, wherein the pre-trained natural language processor comprises one or more pre-trained language models that applies at least one of an Embedding from Language Model (ELMO) or Bidirectional Representations from Transformers (BERT) to derive the categorical and continuous attributes;

feed, via the machine learning engine, a defined set of demographical data to the pre-trained natural language processor and combine an output of the derived categorical and continuous attributes with the defined set of demographic data to a candidate data store;

direct, a second type of input data corresponding to the categorical variables to a graph processor, to generate an entity graph also configured to receive an input of other prior data records and corresponding attributes to determine relationships in the entity graph and a comparison between common attributes of current and prior data records;

feed the entity graph to a graph convolutional network and determine common digital paths for the prior data records to reach a given state providing an entity graph output via the graph convolutional network; and combine, using a machine learning ensemble model, the entity graph output and information retrieved from the candidate data store to provide a single output prediction of intelligent query responses comprising recommended visualization of recommended digital actions for the requesting device, wherein the machine learning ensemble model applies one of random forest modelling and decision tree modelling to combine results of outputs from processing each of the first and second types of input data via the pre-trained natural language processor and graph convolutional network respectively.

* * * * *